ALL RELAY SYSTEM IN WHICH LOCAL CALLED TELEPHONE LINE IS FED TALKING BATTERY FROM CONNECTOR OR REPEATER

Filed July 22, 1947 10 Sheets-Sheet 1

*INVENTOR.*
ROY W. JONES
*BY*
[signature]
ATTORNEY

Sept. 19, 1950

R. W. JONES 2,522,720

ALL RELAY SYSTEM IN WHICH LOCAL CALLED TELEPHONE LINE IS FED TALKING BATTERY FROM CONNECTOR OR REPEATER

Filed July 22, 1947

10 Sheets-Sheet 2

INVENTOR.
ROY W. JONES

BY

Chas. M. Carly

ATTORNEY

INVENTOR.
ROY W. JONES
BY
Chas. W. Candy
ATTORNEY

INVENTOR.
ROY W. JONES
BY
Chas. W. Candy
ATTORNEY

ALL RELAY SYSTEM IN WHICH LOCAL CALLED TELEPHONE LINE IS FED TALKING BATTERY FROM CONNECTOR OR REPEATER

Filed July 22, 1947 10 Sheets-Sheet 5

INVENTOR.
ROY W. JONES
BY
[signature]
ATTORNEY

ALL RELAY SYSTEM IN WHICH LOCAL CALLED TELEPHONE LINE IS FED TALKING BATTERY FROM CONNECTOR OR REPEATER

Filed July 22, 1947 10 Sheets-Sheet 6

INVENTOR.
ROY W. JONES
BY
Chas. W. Candy
ATTORNEY

INVENTOR.
ROY W. JONES

BY Chas. W. Cardy

ATTORNEY

Sept. 19, 1950 R. W. JONES 2,522,720

ALL RELAY SYSTEM IN WHICH LOCAL CALLED TELEPHONE LINE IS FED TALKING BATTERY FROM CONNECTOR OR REPEATER

Filed July 22, 1947 10 Sheets-Sheet 8

INVENTOR.
ROY W. JONES

BY [signature]

ATTORNEY

Sept. 19, 1950

R. W. JONES 2,522,720

ALL RELAY SYSTEM IN WHICH LOCAL CALLED TELEPHONE LINE IS FED TALKING BATTERY FROM CONNECTOR OR REPEATER

Filed July 22, 1947

10 Sheets-Sheet 9

INVENTOR.
ROY W. JONES

BY

ATTORNEY

Sept. 19, 1950 R. W. JONES 2,522,720

ALL RELAY SYSTEM IN WHICH LOCAL CALLED TELEPHONE LINE IS FED TALKING BATTERY FROM CONNECTOR OR REPEATER

Filed July 22, 1947 10 Sheets-Sheet 10

INVENTOR.
ROY W. JONES

BY Chas. W. Cardy
ATTORNEY

Patented Sept. 19, 1950

2,522,720

UNITED STATES PATENT OFFICE 2,522,720

ALL RELAY SYSTEM IN WHICH LOCAL CALLED TELEPHONE LINE IS FED TALKING BATTERY FROM CONNECTOR OR REPEATER

Roy W. Jones, Rochester, N. Y., assignor to Automatic Electric Laboratories, Inc., Chicago, Ill., a corporation of Delaware Application July 22, 1947, Serial No. 762,750

6 Claims. (Cl. 179—18)

The present invention relates in general to automatic telephone systems and more particularly to improvements in automatic switching equipment of the all relay type.

In the past it has been the general practice in all relay type telephone systems to have the connector furnish talking battery to the calling party at one point and to the called party at another point, the two points being separated from each other by means of condensers. It has been found to be advantageous on calls which include a trunk line in the connection to switch through the connector clear of all talking battery bridges and attachments. It is, therefore, an object of this invention to provide a connector of the all relay type which switches calls of a particular origin or destination, through the connector clear of all bridges and attachments.

Another object of the invention is the provision of a two way repeater which furnishes talking battery to the local subscriber on certain calls.

Other objects and features of the invention will become apparent upon a further perusal of the specification taken in conjunction with the accompanying drawings which form a part of the specification.

Figure 1:
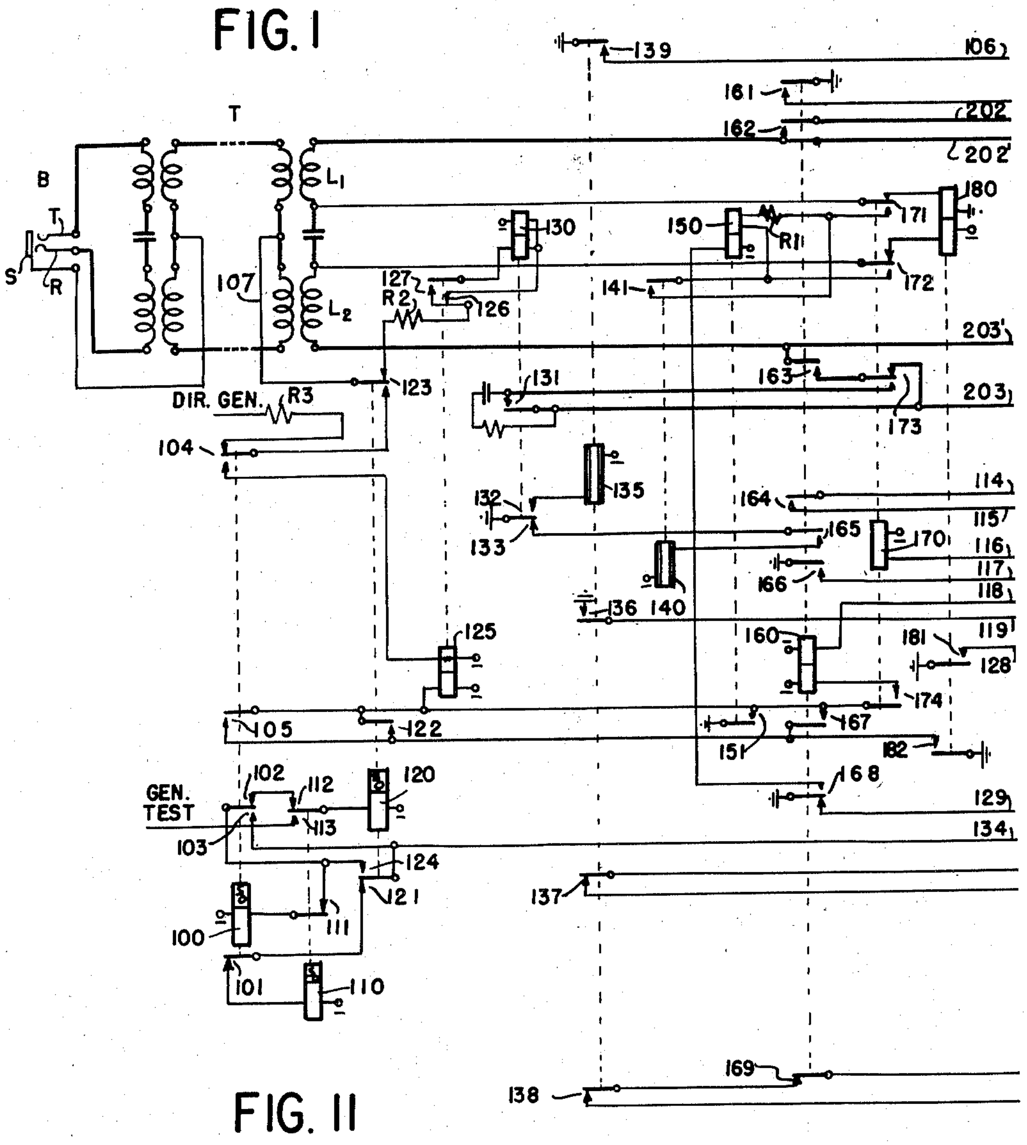
Figure 11:
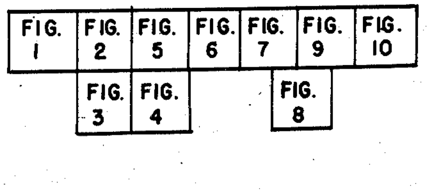
Figure 2:
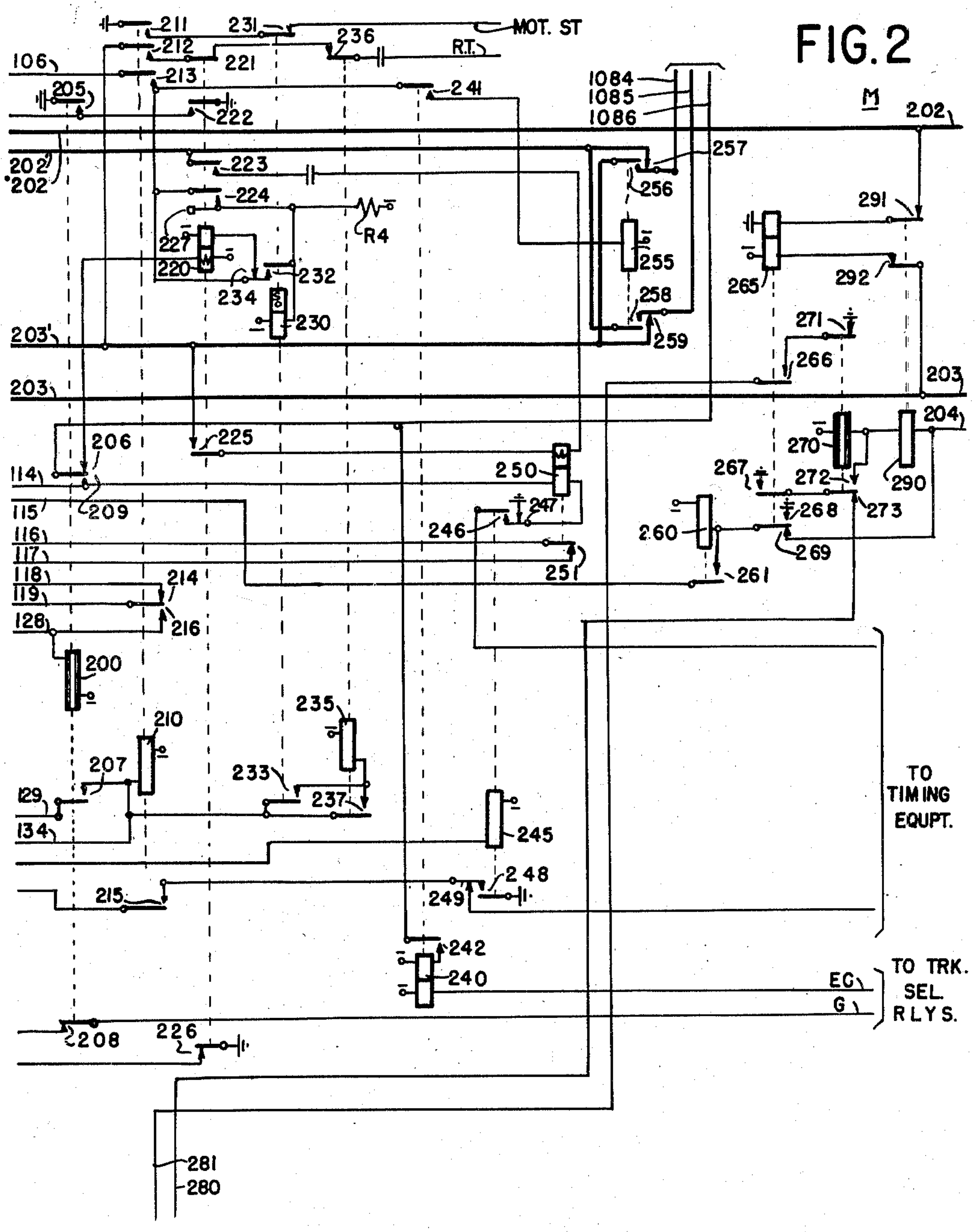
Figure 3:
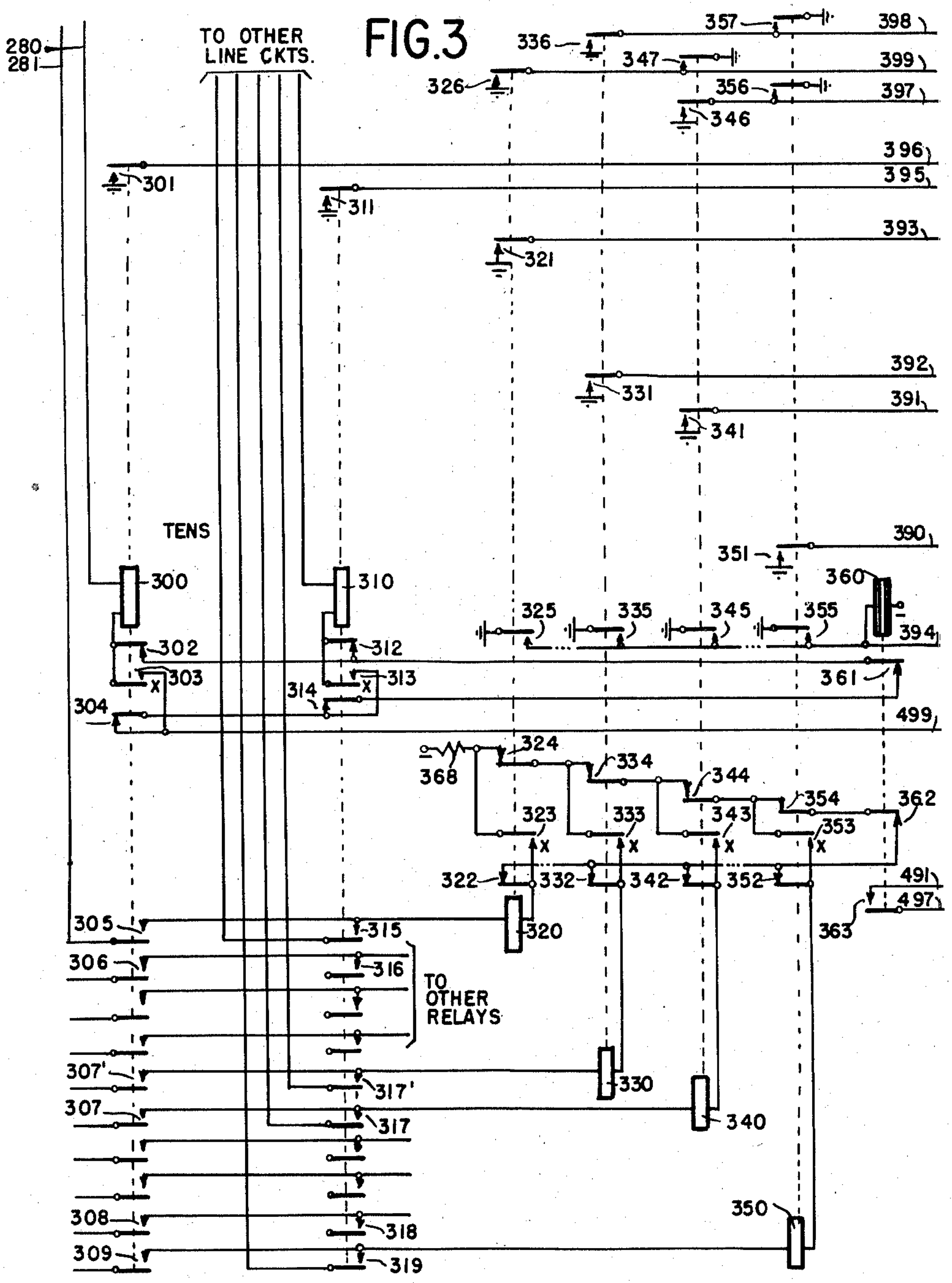
Figure 4:
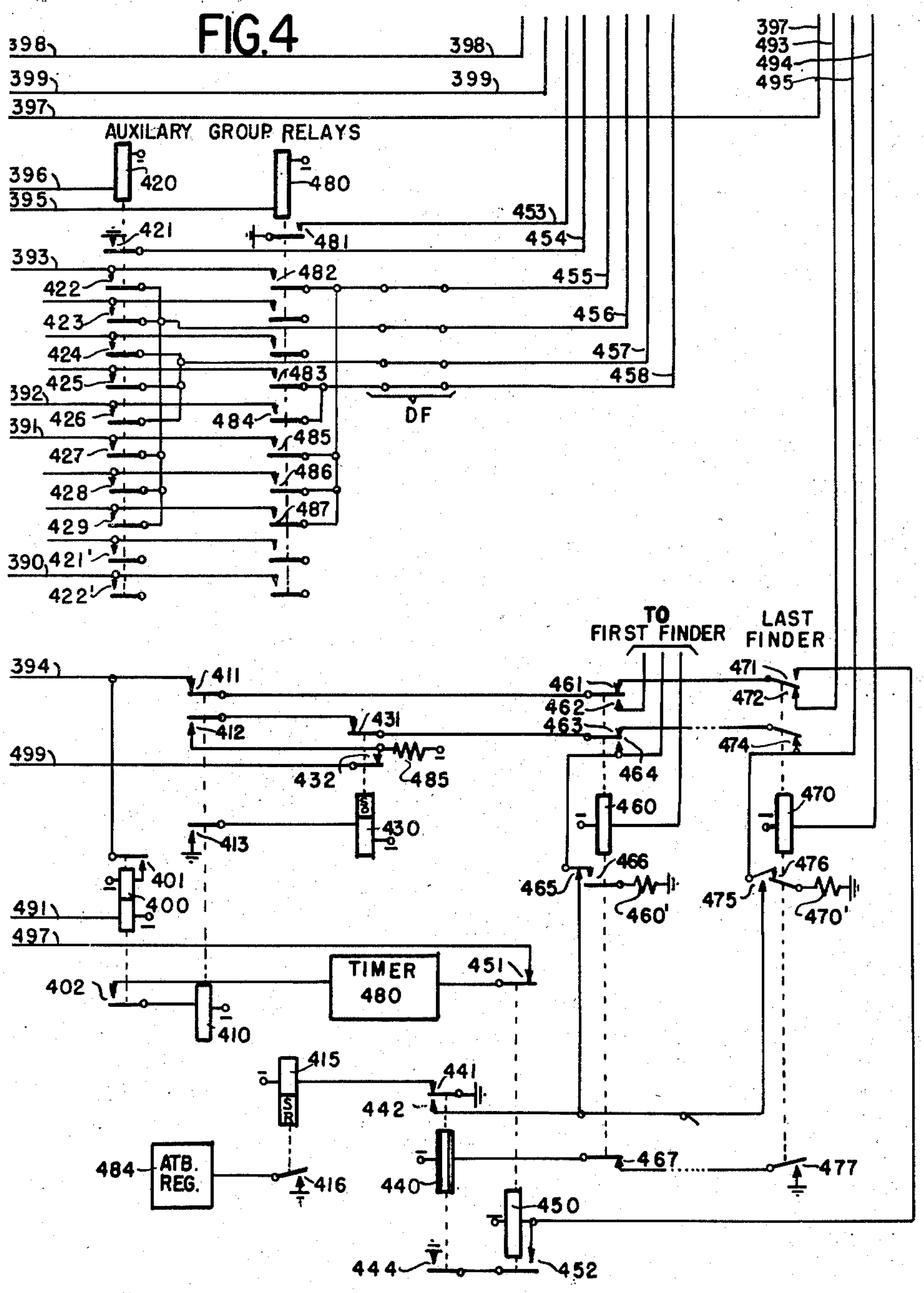

The drawings when arranged as indicated in Figure 11, with adjoining lines abutting, represents a portion of an all relay type telephone system such as is disclosed in U. S. Patent 2,491,291 issued to John H. Voss et al. on December 13, 1949, but modified so as to attain the objectives hereinbefore stated. Figure 1 shows a well known simplex type toll trunk T leading to a two way repeater part of which is also shown in Figure 1. Figure 2 completes the repeater which terminates in a trunk line circuit M. Figures 3–10 show a linefinder connector link with an associated allotter. It is to be understood that in the interest of simplicity various units of the system are not shown complete but show only what is thought necessary to disclose the invention and the principal embodiments thereof. The call allotter in Figure 3 shows only sufficient group and unit relays to describe its operation, it being understood that a group relay such as 300, etc., is required for each 10 lines and a complete board requires 10 unit relays such as 320, etc. The allotter shown in Figures 3 and 4 is the well known cyclic type for pre-assigning the order in which idle links are used in extending successive calls.

Figure 5:
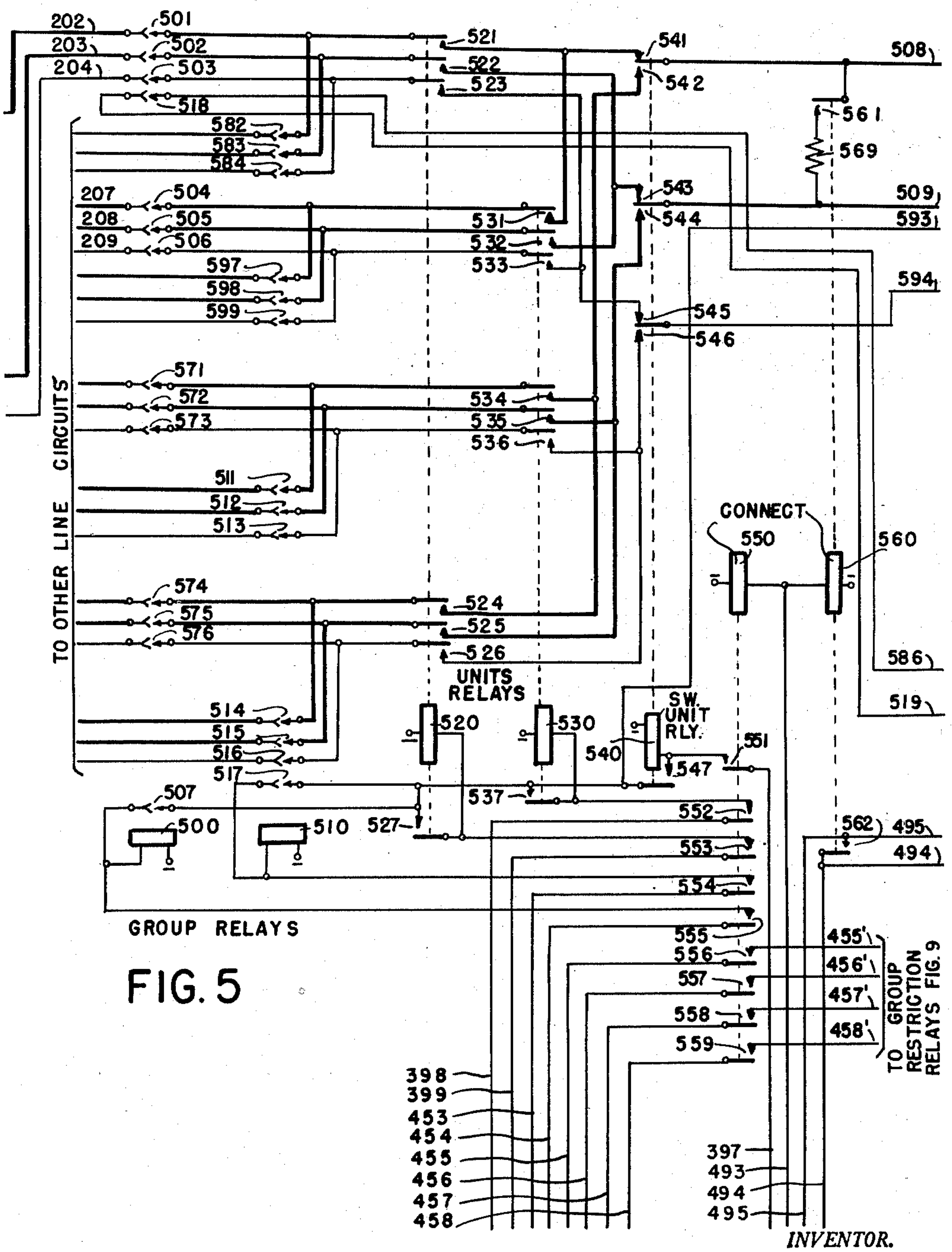

In Figure 5 only a portion of a complete link is shown. It is understood that a group connect relay like 500 is required for each 10 lines equipped or a total of 20 such relays for 200 lines. Only two of the five unit relays and the unit switching relay 540 are shown.

In Figure 4 line restricting relays are shown. It is understood that a relay is provided for each group of ten lines having lines of a special service character. Two such relays, 420 and 480, are shown and should be considered as auxiliary relays to tens group relays 300 and 310. Such relays are effective only during the period that a finder is being extended to a calling line and further extends a special service line marking to a predetermined group restricting relay 930, 940 or 950 in the connector.

Figure 9:
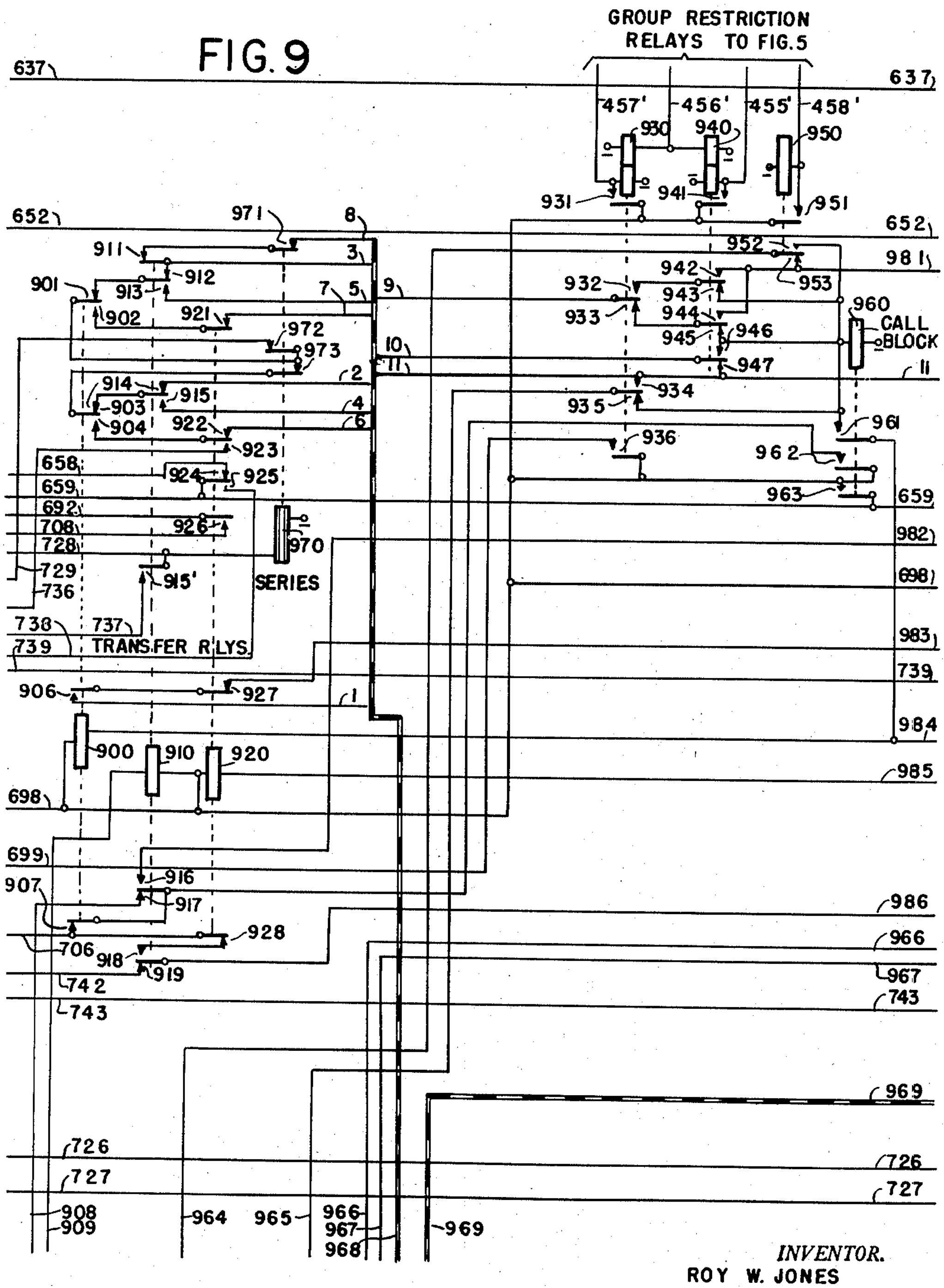

The connector group restricting relays are shown in Figure 9 and it is understood one relay or combination of relays is required for each restricted class of lines of which three relays 930, 940 and 950 are shown to provide four classes of restricted lines, together with a common call blocking relay 960. The latter is effective only if a connector group is called by an unauthorized line.

The time pulse generator 760'; ringing interrupter 761, the ringing generator and tone generator are well known and are only diagrammatically shown. It is understood such apparatus may be either of the relay or motor driven cam type.

Figure 10:
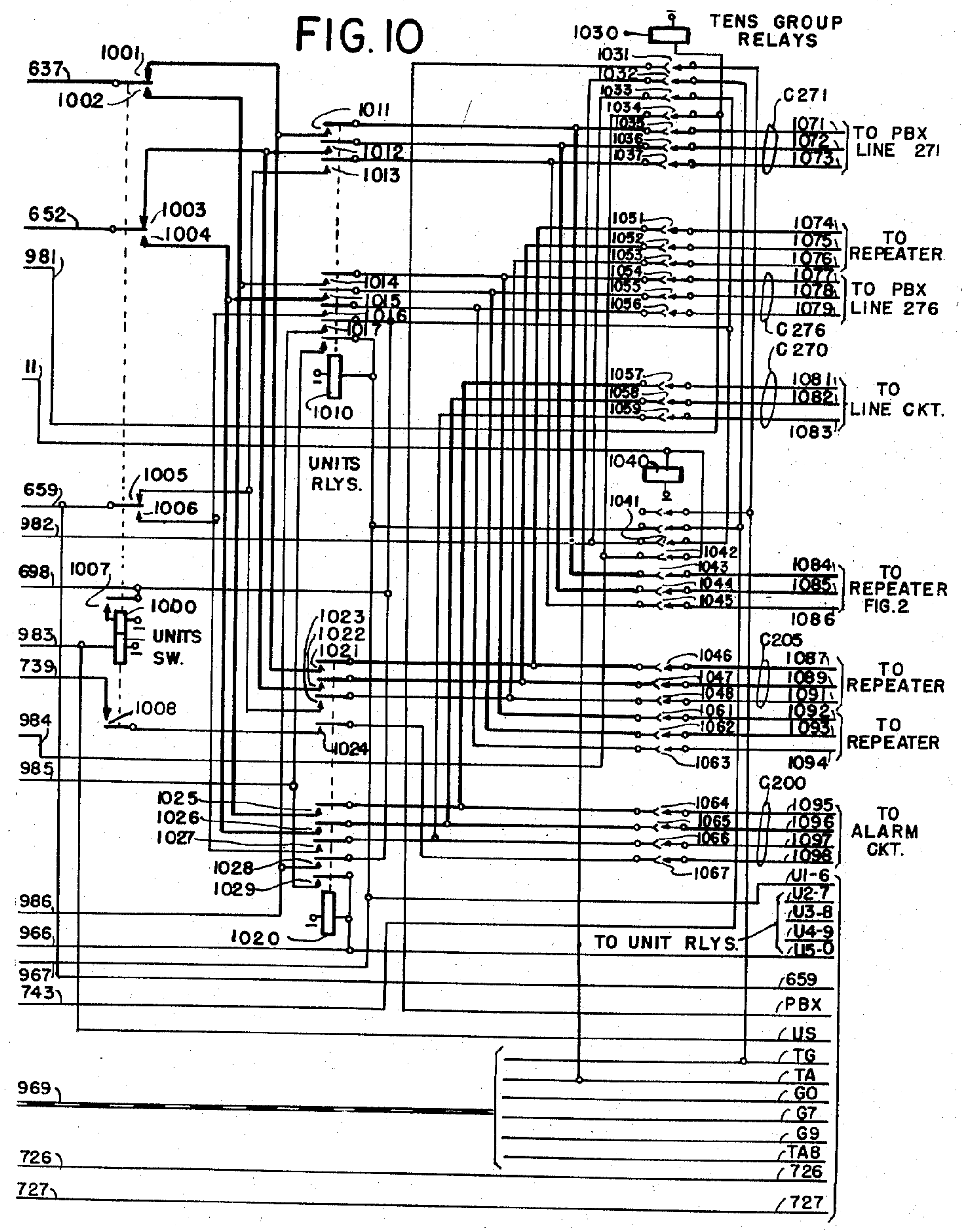

Figures 6, 7, 8, 9, and 10 illustrate a 200 line all-relay type connector having 20 tens, or group, relays, five units relays and a switching unit relay, and other control relays. The general character of this apparatus is similar to that described in the aforementioned application and is well known. Briefly described it is of the 200 line type with a maximum of 20 parties per line. Four digits are required to call local stations of which the first digit determines the hundreds group and the station ringing group, the second digit determines the tens group of the selected hundreds group, the third digit determines the individual line (unit) of the selected tens group, and the fourth digit determines the particular ringing signal of the selected group of signals. The trunk groups are selected by one digit numbers. Only two of the connector tens, or group, relays 1030 and 1040, two of the connector units relays, 1010 and 1020, and the units switching relay 1000 are shown in Figure 10 in order to simplify the description of the drawings. Each small trunk group can be considered as a sub-group of the tens group. A plurality of such sub-groups together with subscribers' lines may be assigned within the same tens group provided the total number of trunks and lines therein is not greater than 10.

Figure 8:
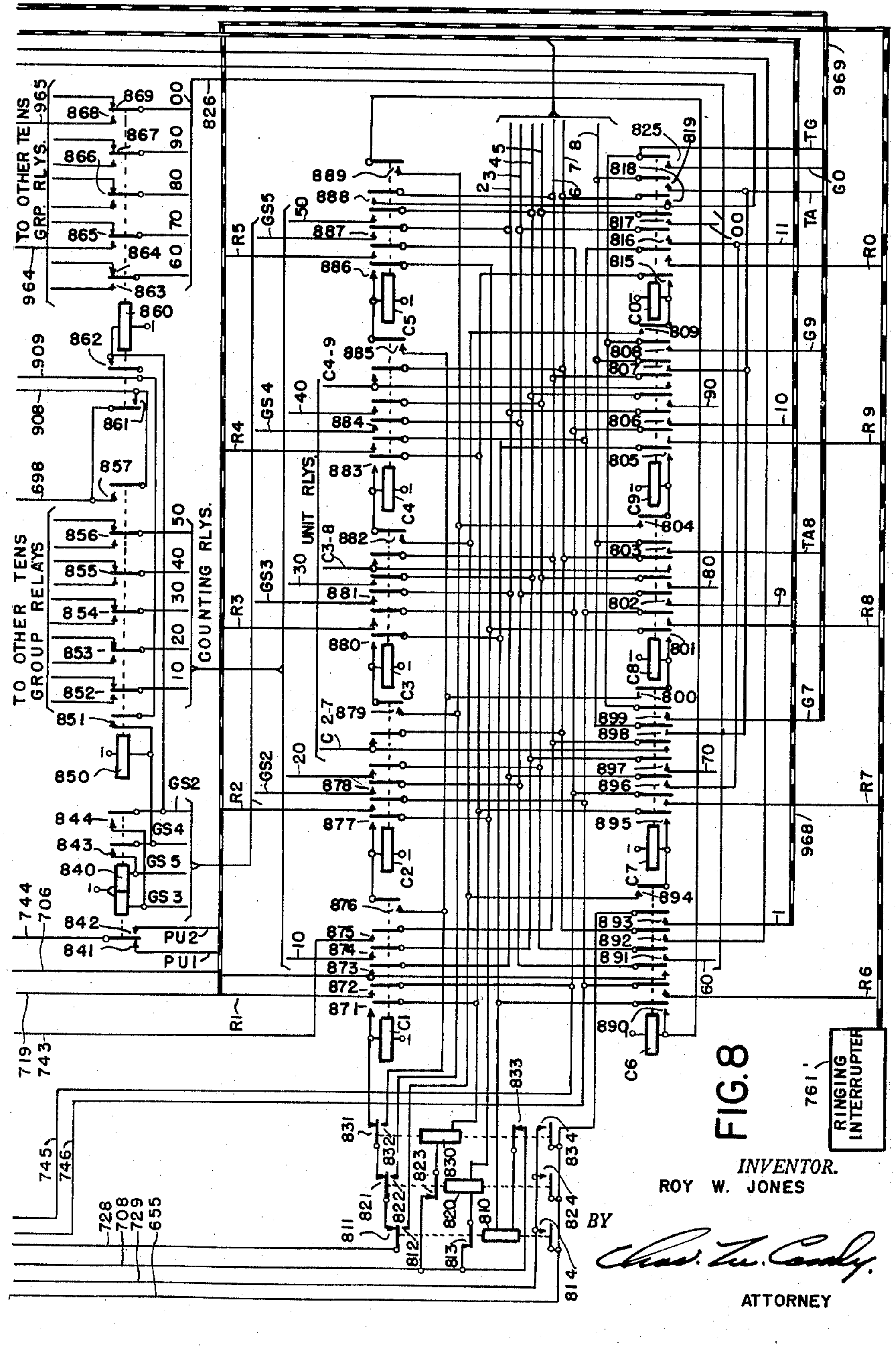

The unit relays 1010 and 1020 previously mentioned are controlled direct from the counting relays, Figure 8, in response to a dialed third digit or are directively energized from trunk selecting relays (not shown) but similar to the ones shown in Figures 11, 14 and 15 in the above mentioned application.

Line terminals C200 are provided for access to remote supervisory apparatus and are the same as any other subscriber line except an additional conductor is provided over which additional dial pulses are repeated.

Having briefly described the purpose of the equipment shown in the drawings, the operation of the system can be better understood by a description based on establishing a connection from a distant toll operator to a local subscriber's line.

Referring now to Figures 1 and 2, the toll operator at the toll board B in initiating a call to a subscriber at the exchange in question, grounds conductor 107 in a well known manner through the well known simplex type toll trunk T. Relay 130 energizes over the following circuit; from battery, upper winding of relay 130, contacts 126, resistance $R_2$, and contacts 123 to grounded conductor 107. Relay 130 thus energized prepares a talk circuit at contacts 131, and completes an obvious energizing circuit for relay 135 at contacts 132. Relay 135 operates and closes a point in a circuit to relay 220 at contacts 139, opens a timing circuit at contacts 137, opens the guard lead at contacts 138 thus busying the repeater to other calls, and completes an obvious circuit to the upper winding of relay 160 at contacts 136. Relay 160 operates over its upper winding and prepares a talking circuit at contacts 162 and 163, closes a point in a circuit to relay 250 at contacts 164, prepares a circuit for relay 140 at contacts 165, completes an obvious energizing circuit for relay 170 at contacts 166, prepares a circuit for relay 125 at contacts 167, completes a circuit to the lower winding of relay 150 at contacts 168, and opens a further point in the guard lead at contacts 169. Relay 170 operates and disconnects relay 130 from the line at contacts 171 and 172, closes a further point in a talking circuit at contacts 173, and prepares a circuit for the lower winding of relay 160 at contacts 174. The line relay 265 in the trunk line circuit M will now energize in series with the upper winding of polar relay 150 as follows: from ground, upper winding of relay 265, contacts 291, conductor 202, contacts 162, conductor 202,′ repeater coil winding $L_1$, make contacts 171, resistance $R_1$, upper winding of relay 150, make contacts 172, repeater coil winding $L_2$ conductor 203′, contacts 163, 173, 131, conductor 203, contacts 292, and lower winding of relay 265 to battery. Relay 265 thus energized connects ground at contacts 266 and 267 to conductors 281 and 280 respectively, the utility of which will be hereinafter described. Both windings of polar relay 150 are now energized but in an opposing manner, hence relay 150 will not operate at this time.

Relay 265 also completes a circuit to relay 260 at contacts 268. Relay 260 operates and completes, at contacts 261, a locking circuit for itself as follows; from battery, winding of relay 260, contacts 261, conductor 115, contacts 164, conductor 114, lower winding of relay 250 and contacts 247 to ground. The lower winding of relay 250 is now shunted by ground on one side at contacts 247 and ground on the other side at contacts 268, hence it will not operate at this time. The grounded conductors 280 and 281 cause the allotter and finder to operate to find the calling line in a manner to be described hereinafter. It is thought sufficient at this point to say that the line finder finds the calling line and by virtue of the resistance bridge 569 in Figure 5 causes line relay 610 in Figure 6 to operate, which in turn operates various relays which cause various subsequent operations among which is the grounding of conductor 204 at contact 642 through contacts 661, conductor 594, contacts 545, 523, 503 when the finder connects with the calling line. Ground on conductor 204 causes relays 290 and 270 to operate in series. In operating relay 290 opens the energizing circuit of line relay 265 at contacts 292 and 291. Relay 270 operates removing ground from conductors 280 and 281 at contacts 271 and 273. Relay 265 restores and opens the original energizing circuit of relay 260 at contacts 268. Relay 265 in restoring opens further points in conductors 280 and 281 at contacts 266 and 267.

The tool operator now operates her dial mechanism to call the local subscriber's number. Relay 130 follows the impulses sent by the dial mechanism over conductor 107 in a well known manner. During the dialing of each digit, relay 130 de-energizes a number of times corresponding to the digit dialed. Relay 130, at each momentary de-energization, opens the loop circuit between conductors 202 and 203 at contacts 131 and opens the energizing circuit for relay 135 at contacts 132. Relay 135 being a slow to release relay will remain operated during pulsing. The first de-energization of relay 130 closes an obvious circuit to relay 140 at contacts 133. Relay 140, also being a slow to release relay, remains operated during pulsing and short circuits the upper winding of relay 150 at contacts 141 to prevent relay 150 from operating due to transient surges which might appear during pulsing, and to improve the pulsing circuit to the connector.

The connector now responds to the dial pulses to connect the toll operator with the called party in a manner to be hereinafter described. When the called party answers the call the connector switches the talking conductors through at contacts 601 and 602 which indirectly causes ground to be removed from conductor 594 at contacts 642. Conductor 594 is still grounded however, by way of conductor 204, and contacts 269, 261, and 164, from ground at contacts 247. It will be seen that relay 250 will now operate over its lower winding in series with relay 260 as follows: from ground, contacts 247, lower winding of relay 250, conductor 114, contacts 164, conductor 115, contacts 261, and winding of relay 260 to battery. Relay 250 thus energized opens the energizing circuit of relay 170 at contacts 251. Relay 170 restores and completes an energizing circuit for relay 180 at back contacts 171 and 172, provides a new path for talking current at contacts 173, and opens a circuit to the lower winding of relay 160 at contacts 174. Relay 180 now operates and furnishes talking battery to the called party, completes an obvious circuit to relay 200 at contacts 181, and completes an energizing circuit for relay 125 at contacts 182. Relay 200 operates and connects ground at contacts 209 from contacts 247 to the connector normal control lead 1086, prepares a circuit for relays 110 and 210 at contacts 207, and opens a further point in the guard lead at contacts 208. Relay 125 operates over the following circuit; from battery, winding of relay 125, contacts 167 and 182 to ground. Relay 125, at make before break contacts 127 and 126, causes relay 130 to now operate over both of its windings instead of just the upper winding as had been the case heretofore. The increase in resistance in the dialing circuit from the toll operator over conductor 107 to battery at relay 130, caused by the insertion of the lower high resistance winding of relay 130 in the circuit, gives the toll operator supervision indicating that the called party has answered the call.

On a call of this type, from a toll operator to a local subscriber, polar relay 150, although energized over both windings, will only operate in response to a reversal of current over conductors 202 and 203. The switch through relay 600 operates immediately after the operation of relay 620 so that the reversal of current momentarily sent by the operation of relay 620 is without effect. If, however, the toll operator is calling through this system to another toll trunk, reverse battery will be had from another repeater such as the one disclosed in Figures 1 and 2. Relay 150 would now operate and complete a circuit for relay 125 at contacts 151 which in turn would give the calling operator supervision as has been explained.

When line relay 265 was energized as previously described marking conductors 280 and 281 were grounded to cause the finder to find the calling line. Relay 300 is energized from ground on conductor 280, winding of relay 300, contacts 302, 361, series chain contacts 314—304, conductor 499, contacts 432, resistance 485 to battery. Contacts 303 are first to close, holding relay 300 energized after the above described primary energizing circuit, for all group relays 300—310, is opened at contacts 302 and 304. Relay 320 operates over the following circuit; from grounded conductor 281, contacts 305, winding of relay 320, contacts 322, 362, series chain contacts 354—324, resistance 368 to battery. Contacts 323 are the first to close, holding relay 320 energized after the above described primary energizing circuit, for all unit relays 320—350, is opened at contacts 322 and 324. Relay 360 is energized at contacts 325, further opening the primary operating circuits of the group relays at contacts 361 and the units relays at contacts 362. Relay 360, at contacts 363, prepares a timing circuit comprising relays 400, 410, and 430. The operation of relays 400—430 together with the link distributor relays 440—470 operate in the same manner as set forth in the previously mentioned co-pending application. For the present it will only be necessary to understand that the illustrated wiring is for the last link in a group to receive the call by showing relay 470 energized, 460 de-energized, and conductor 394 connected through closed contacts 411, 461, 472, conductor 493 to the connect relays 550 and 560. Relays 550 and 560 energize in multiple with relay 360 over the above traced circuit from ground at closed contacts 325. Relay 550 at contacts 551—555 extends conductors 397, 398, 399, 453 and 454 to the subgroup, or switching unit, relay 540, unit relays 530, 520 and group relays 510, 500, respectively.

The group relays 500, 510 are controllable either direct from corresponding group relays 300, 310 in the allotter when the group does not have restricted lines or from the auxiliary group relays 420, 480 when restricted lines are assigned. Unit relays 520—530 are controllable from allotter unit relays 320, 330 at contacts 326, 336 and also are controllable from allotter unit relays 340, 350 at contacts 347, 357 respectively. Relays 340 and 350 representing the unit digits 6 and 0 also control subgroup, or switch unit, relay 540 at contacts 346 and 356. In this case relay 500 is operated from ground at contacts 421. Relay 320, operated in response to the grounding of conductor 281, extends ground from contacts 321 over conductor 393, contacts 422, conductor 456, contacts 557, conductor 456' to the upper winding of relays 930 and 940 to battery. Relay 930 operates and locks up over its lower winding at contacts 931 to a main holding ground on conductor 698 (to be explained at a subsequent time) and also extends this ground through contacts 936, conductor 699 to the lower winding of relay 625 and battery. Relay 625 operates and locks up over its upper winding and contacts 628 to grounded conductor 698 and extends this ground through the same contacts, conductor 519, contacts 518, conductor 586 to the upper winding of relay 644 and battery. Relay 644 operates and extends ground at contacts 646' through conductor 625' and contacts 778 to conductor 746'. The utility of this operation will be described in connection with the switch through relay 600 in the section describing the connector operation.

Specifically, when relays 300 and 320 are energized as described hereinbefore, relays 420, 500, 520, 930 and 940 are energized. Relay 420 is energized from battery, winding of relay 420, conductor 396, contacts 301 to ground. Relay 420 at contacts 421 extends ground to conductor 454 and winding of relay 500 to battery. Relay 500 closes contacts for a group of ten lines, including contacts 501, 502, 503 and 518 for extending conductors 202, 203, and 204 to contacts 521, 522 and 523, and for connecting conductor 519 to conductor 586 at contacts 518. Relay 520 is energized from battery, winding of relay 520, contacts 553, conductor 399 to ground at contacts 326. Contacts 521, 522, and 523 connect the extended conductors 202, 203 and 204 through contacts 541, 543 and 545 to conductors 508, 509 and 594 respectively. As previously described, relay 560 is energized in multiple with relay 550. An energizing circuit is closed at contacts 561 for line relay 610 which is traceable from the ground, upper winding of relay 610, contacts 621, 601', conductor 508, contacts 561, resistance 569, conductor 509, contacts 602', 623 and lower winding of relay 610 to battery. Relay 610 at contacts 611 extends ground at contacts 663 for energizing relay 630. Relay 630 at contacts 631 closes a multiple ground through resistance 615 to relay 630 to hold relay 630 energized until contacts 611 are opened. At contacts 633 relay 630 extends ground at contacts 681 to energize relay 640. Contacts 642 energize relay 660. Contacts 642' prepare a locking circuit for the relay 780. At contacts 664, relay 660 connects ground to hold conductor 593. The energized relay 660 at contacts 661 extends ground at contacts 642 to conductor 594 which energizes relays 290 and 270 in series over conductor 204, contacts 503, 523, 545 and conductor 594. Relay 290 at contacts 291 and 292 opens the circuit to line relay 265. Relay 265 restores and opens contacts 266 and 268, thus allowing relays 300 and 320 to restore. Contacts 325 open, de-energizing relays 360, 550 and 560. On restoring relay 300 opens contacts 301, thus causing relay 420 to restore. After a slight delay, relay 360 restores and the common equipment in Figure 3 is in the normal position for extending a new call. Relays 500, 520, 290 and 270 remain operated from ground on conductors 593 and 594.

*Link distributor*

Before proceeding with the description of the connector relays, the operation of the link distributor will be described.

From the previous description, relay 660 was operated after relay 560 energized. Relay 660 opens contacts 669′ and after relay 560 is de-energized, contacts 562 are opened. This combination of relay 560 de-energized and relay 660 energized opens the closed circuit between conductors 495 and 494 and relay 470 de-energizes. Relay 470 at contacts 477 will complete the chain circuit through contacts 467 to relay 440. An incomplete circuit is prepared at contacts 475 for re-energizing relay 470. It must be understood at this time that this busy link has relay 660 energized, therefore relay 470 can not be re-energized because its operating circuit is opened at contacts 669′. The same condition exists on all other busy links and each associated link relay such as 460, 470 can not be re-energized if the link is busy.

For explanatory purposes, we will assume that the link associated with relay 470 is idle. Relay 440, energized from closed chain contacts 477—467, extends ground from contact 442 to contacts 465, 475. All corresponding relays associated with idle links are energized in a like manner as will be explained for relay 470; from ground, contacts 442, 475, conductor 495, contacts 684, 669′, conductor 494 and winding of relay 470 to battery. Relay 470 at contacts 472 prepares an energizing circuit for connect relays 550, 560. Preceding relays such as 460 are also operated in a like manner, and conductor 394 is extended to the corresponding link. After a call is extended by each preceeding allotted link, the associated distributor relays 460, etc., are de-energized in the same manner as described for relay 470. Contacts such as 461 are reclosed and conductor 394 is extended through the contacts to the next link such as to contacts 472 to conductor 493.

If all links are busy, relays 460—470 can not re-operate and relay 440 remains in the operated position. The circuit to the slow to release relay 415 remains open at contacts 441. Relay 415 de-energizes after a slight delay and operates the all trunk busy register 434 from contacts 416. In addition chain contacts 461, 471 extend conductor 394 to relay 450. If a call is initiated during the all link busy condition, ground at contacts 325 or similar contacts will energize relay 450 and 360. A multiple holding circuit for relay 450 is completed from ground contacts 444 and 452. Relay 450 at contacts 451 opens the timer circuit extending to the lower winding of relay 400. After a link becomes idle, the associated relay such as 460 or 470 is re-operated as described hereinbefore and relays 440, 450 will restore to the normal position.

In case an allotted link is not extended to a callin line within a pre-determined time period, calling line with a pre-determined time period on to the next link in the following manner. Relays 300, 320, 470 together with 360, 550, and 560 are operated as previously described. Relay 360, at contacts 363, extends the time pulse lead TP1 at timer 480 to conductor 491 and lower winding of relay 400. A ground pulse on TP1 conductor from the timer unit 480 energizes relay 400 which locks through contacts 401 to ground at contacts 325. Relay 400 at contacts 402 extends the second time pulse conductor TP2 to relay 410. The timer 480 is well known and is not shown in detail. It is only necessary to know that the timer unit extends a ground pulse TP2 approximately three seconds after the time pulse to conductor TP1. This time interval is of sufficient time duration for the normal extension of a link to the calling line and the release of relays 300, 320. We will assume the link is not extended and that relay 410 is operated after the stated time interval. At contacts 412, battery is extended from resistance 485 through contacts 431, 463, 474, conductor 495, contacts 562, conductor 494, to relay 470 and battery. This battery connection to relay 470 shunts relay 470 and relay 470 restores to assign a new link as hereinbefore described. Relay 410 at contacts 413 energizes slow to operate relay 430. The operating delay for relay 430 is sufficient to make the shunt effective to release relay 470 before contacts 431 are opened. Contacts 432 disconnects battery through resistance 485 so that any operated tens guard relay, such as relay 300, restores to prevent a faulty line circuit from holding the distributor and sequentially taking into use successive idle links. Contacts 305 open and relay 320 restores. Contacts 325 open and relays 360 and 400 restore to open the circuits to relays 410 and 430. After contacts 304, 302 and 361 are reclosed, 300, 320 are again energized from relay 265 and the call is established over the next link. It is understood that any call having a preferred assignment will be extended before the released call is extended the second time.

*Connector*

Figure 6:
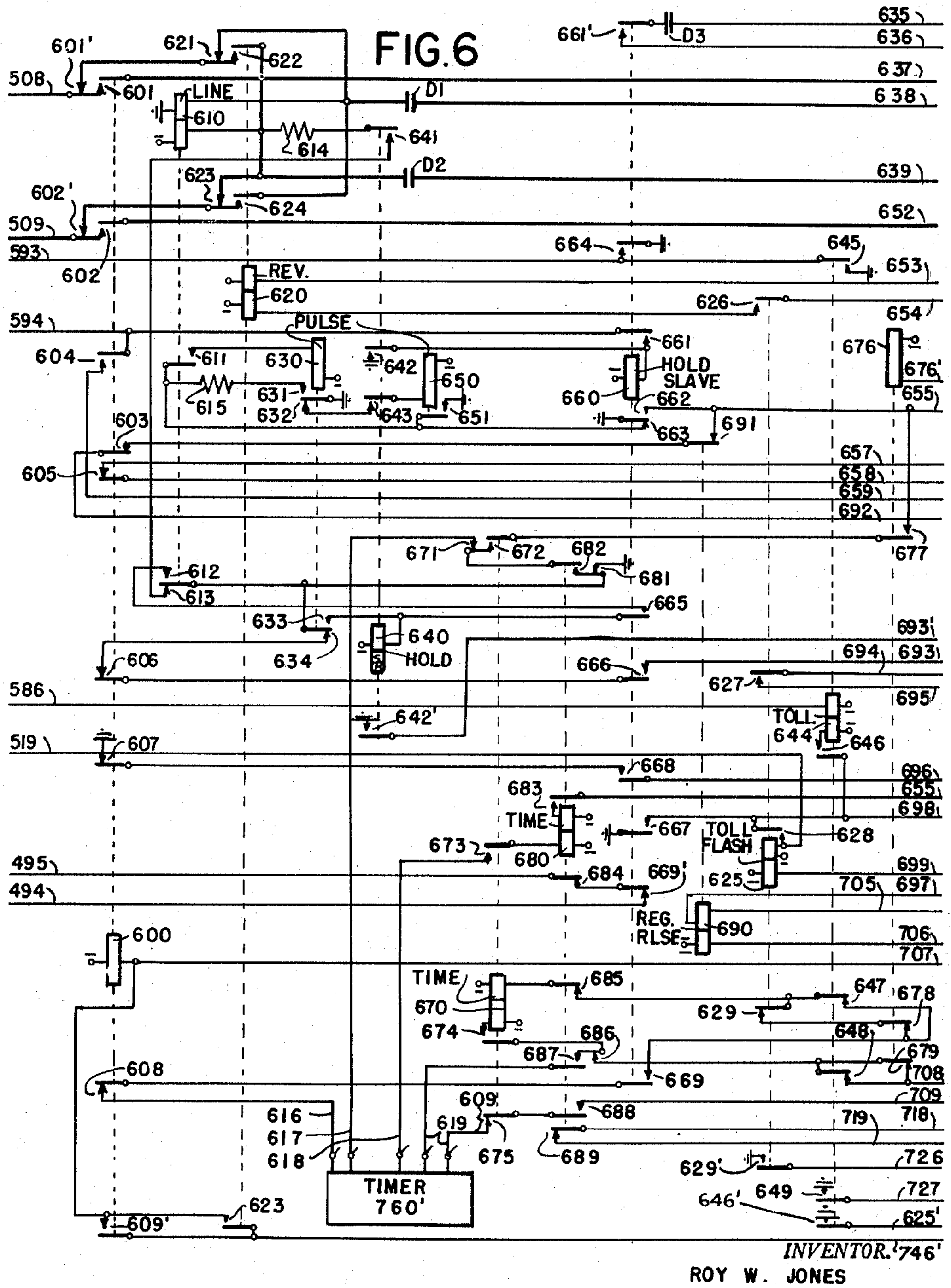
Figure 7:
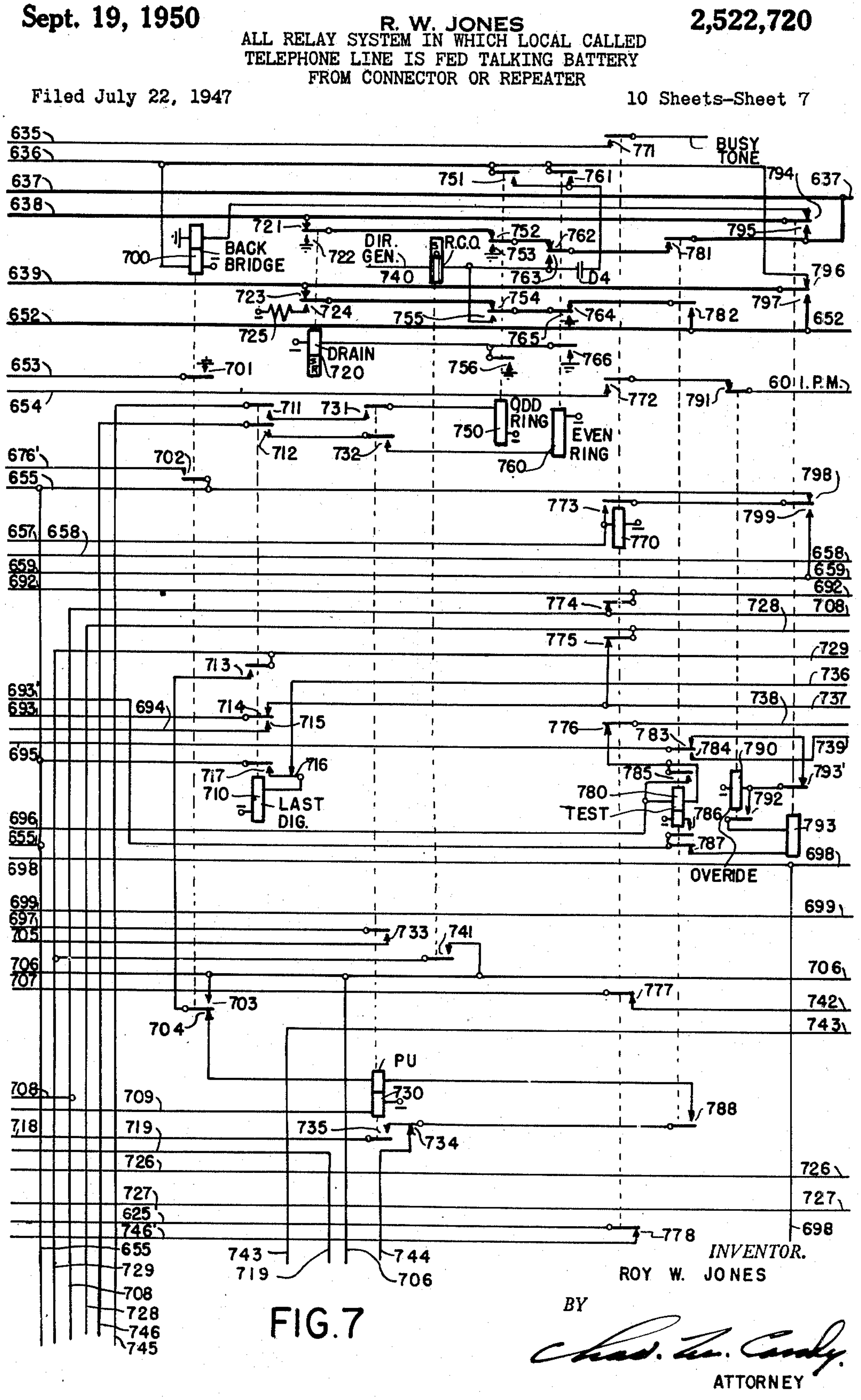

In the preceding description a call was established from the toll operator through the repeater and the line finder link Figure 5 to conductors 508, 509, in Figure 6 of the connector. Relay 610 was first energized from contacts 561. After the described release of relay 560, relay 610 is held in the energized position over the calling loop of the repeater in Figure 1. Further, relays 630, 640 and 660 are energized at contacts 611, 633 and 642, respectively, preparing the additional control paths.

We will now describe the operation of the connector in response to the toll operator dialing the called station directory number 270 plus the ringing digit 1.

The loop circuit between the line conductors 508 and 509 is successively opened and closed at contacts 131 by relay 130 which follows the dial impulses sent over conductor 107 by the toll operator. Relay 610 follows these dial impulses, opening and closing contacts 611, 612 and 613. Relay 640, being slow to release, holds relay 660 energized during successive dial impulses. Relay 630 restores after contacts 611 open and at contacts 634, ground is extended through contacts 606, 666, conductor 693, contacts 714, 775, conductor 728, contacts 811, 821, 831, winding of relay C1 to battery. Relay 970, connected to conductor 728 in multiple with relay C1, energizes over the circuit traced above. Slow to release relay 970 does not restore between successive dial pulses and at contacts 971—973 the control paths from contacts on relays C1 to C0 are temporarily disabled. Relay C1 at contacts 871 prepares a circuit for energizing relay 830 in series with relay C1 after ground is removed from conductor 728 at springs 634. The above operations have taken place during the open period of the first impulse from the calling station dial. The dial springs again reclose and relay 610 is re-energized. The energization of relay 610 is aided by a circuit through resistance 614, contacts 641, contacts 613 to ground at contacts 681. Ground through resistance 614 will not re-operate relay 610 until the loop between conductors 508 and 509 is re-closed at contacts 131. Relay 650 is energized from contacts 643, 632. Relay 630 re-energizes from ground at contacts 651, and contacts 611 to battery at relay 630. Relay 610 at contacts 612 re-closes a multiple circuit for holding relay 640 from ground at contacts 681. Relay 630 at contacts 632 de-energizes relay 650 and at contacts 634 opens the impulsing circuit previously traced to relay C1. Relay C1 remains energized from contacts 871, winding of relay 830, contacts 823, conductor 708, contacts 774, conductor 692, contacts 603, contacts 691, to ground at contacts 662. Prior to the re-operation of relay 630, ground through contacts 634 to conductor 728 shunted relay 830. Relay 830 now energizes in series with the winding of relay C1. The first described circuit to relay C1 is further opened at contacts 831 and an energizing circuit for relay C2 is prepared at contacts 832 and 876. It should be noted at this time that the purpose of relay 650 is to insure an effective pulse to relay C1 from contacts 634. Relay 630 normally can not be re-energized even if line relay 610 is energized until relay 650 closes contacts 651. Relay 650 energizes slower than relay C1, therefore it is obvious that should relay 610 be re-energized prematurely, the re-energizing path for relay 630 is not effective until a ground pulse of sufficient duration has been sent to relay C1 to cause its operation.

In a like manner to that described for the energization of relays C1 and 830, relays C2 and 820 are energized in response to the second impulse. Contacts 823 open and relays 830, C1 restore. Slow to release relay 970 remains in the operated position during successive impulses and prevents the counting relays from effectively energizing any transfer circuits during this period.

The first digit of the called number is 2. During the pause between digits, relays 610, 630, 640 and 660 are energized, relay 970 restores and the following relay operations are completed. Relay 860 is energized from battery, winding of relay 860, conductor GS2, contacts 878, conductor 3 of cable 968, contacts 912, 901, 972, conductor 729, contacts 824, conductor 655 to ground at contacts 662. Relay 860 at contacts 862 closes a multiple holding circuit in series with relay 910 to ground on conductor 698. The ground circuit which operates relay 860 prevents relay 910 from operating at this time. Relay 860 at contacts 861 energizes relay 690 from battery, lower winding of relay 690, conductor 706, contacts 907, 917, conductor 908, contacts 861, conductor 698 to ground at contacts 667. Relay 690 at contacts 691 opens the holding ground circuit for relays 820 and C2. Relay 820 and C2 restore, removing the ground shunt to relay 910 at contacts 824 and 878. Relay 910 now energizes in series with relay 860, from contacts 862, conductor 909, winding of relay 910, conductor 698 to ground at contacts 667. Relay 910 at contacts 916 and 917 transfers the energizing circuit for relay 690 from conductor 908 to 982 and relay 690 de-energizes.

The connector is now ready to receive the second digit 7. The operation for the first two impulses is the same as described for the first digit. Briefly summarized, relay 610 de-energizes relay 630 which energizes relay C1 by extending ground from contacts 681, contacts 634, 606, 656, conductor 693, contacts 714, 775, conductor 728, contacts 811, 821, 831 to battery at relay C1. The above traced circuit is extended through contacts 871, the winding of relay 830, contacts 823 to ground on conductor 708. After the first impulse, relays 610, 630 are again re-energized, ground is disconnected from pulse conductor 728 at contacts 634 and relay 830 is energized in series with the winding of relay C1. Relay C2 is connected to conductors 728 through contacts 876, 832. On the next impulse, ground is again connected to conductor 728 at contacts 634 energizing relay C2. At contacts 877 a circuit is prepared for energizing relay 820. After the second impulse, ground is again opened to conductor 728 at contacts 634 and relay 820 energizes. Relay 820 at contacts 823 opens the circuit for relays 830 and C1. Relays C2 and 820 prepare the energizing circuit for relay C3 at contacts 879 and 822. In a like manner relay C3 followed by relay 810 are energized from the third impulse which prepares an energizing circuit for relay C4 at contacts 882 and 812 and de-energizes relays 820 and C2 at contacts 813. On the next impulse relay C4 followed by relay 830 are energized and relays C3 and 810 restore. In a similar manner successive impulses energize corresponding relays and after seven impulses, relays C7 and 830 are energized. Slow to release relays 640 and 970 together with relay 660 remain in the energized position during the dialing period. Relay 970 de-energizes during the interdigital pause. Contacts 971, 972, and 973 are reclosed, extending ground on conductor 655, contacts 834 over conductor 729, contacts 972, 973, 903 and 915, conductor 4 in cable 968, contacts 897 of relay C7, conductor 70 in cable 826, contacts 864, conductor 964, contacts 953, conductor 981, and winding of relay 1030 to battery. Relay 1030 energizes relay 690, and at contacts 1034 prepares a self-locking circuit for relay 1030 in series with relay 900. Relay 900 is shunted by the ground initially energizing relay 1030 until the circuit to conductor 981 is opened at contacts 834. Relay 690 energizes over a circuit comprising ground at contacts 667, conductor 698, contacts 1033, conductor 982, contacts 916, contacts 907, conductor 706, winding of relay 690 to battery. Relay 690 at contacts 691 de-energizes relays 830 and C7 opening contacts 834 and 897 which disconnects ground from the primary operating circuit for relay 1030. Relay 900 energizes in series with relay 1030. At contacts 906 a circuit is prepared over which relay 1000 energizes in case the next digit is greater than 5. Relay 900 at contacts 907 opens the circuit to relay 690 and at contacts 904, 903, transfers conductor 729 from conductor 4 to conductor 6 of cable 968. At contacts 902, conductor 729 is extended to conductor 7 of cable 968. Relay 690 de-energizes and prepares at contacts 691 a ground circuit for energizing relays 810—830 during the next digit.

The next digit 0 is dialed in a like manner. Relays 610 and 630 follow the impulses and contacts 634 are opened and closed ten times. The counting relays C1 to C0 together with the sequence relays 810—830 are energized on each impulse as previously described. In a like manner relay 970 remains energized during impulses. After the tenth impulse, relays C0 and 830 are energized and relay 970 restores, energizing relay 1020 by connecting grounded conductor 729 at contacts 972 to conductor 7 of cable 968 by way of contacts 902, 921, contacts 818, conductor 966 and winding of relay 1020 to battery. On the sixth impulse, relay C6 energizes relay 1000 from ground on conductor 655, contacts 893, conductor 1 in cable 968, contacts 906, 927, conductor 983, relay 1000 to battery. Relay 1000 at contacts 1007 locks to ground on conductor 698. At contacts 1002, 1004, 1006, conductors 637, 652, and 659 are extended to contacts on the unit relays 1010, 1020, that correspond to lines that end in digits 6 to 0. At contacts 1029, a holding circuit is prepared for relay 1020 in series with relay 920. Battery for energizing relay 920 is shunted by the ground on conductor 966 at the coil 1020. Relay 690 is energized at contacts 1028 from ground on conductor 698, contacts 1028, conductor 986, contacts 918 and 928, conductor 706 to battery at the coil of relay 690. At contacts 691, conductor 708 is disconnected from ground and relays C0 and 830 restore, opening contacts 834 and 818. Relay 920 now energizes in series with relay 1020. Relay 920 at contacts 927 opens the energizing circuit for relay 1000 and at contacts 923 prepares a circuit over which relay 710 energizes after the next digit is dialed. Relay 1000 is maintained energized over its upper winding, contacts 1007 to grounded conductor 698. Relay 690 is de-energized at contacts 928 and the counting relays are again ready to receive the next series of impulses. It is understood that the called line is free and battery is extended from the cutoff relay in the called party's line circuit (not shown) through conductor 1083, contacts 1059, 1027, 1006 to conductor 659. Relay 920 at contacts 925 extends the above traced test circuit by way of conductor 738 and contacts 776 to the upper winding of relay 780 which energizes from ground on conductor 696 by way of contacts 668 and 697. Relay 780 at contacts 786 locks to ground on contact 642' and at contacts 785 the energizing winding of relay 780 is shunted. Relay 780 at contacts 781 and 782 prepares a circuit between back bridge relay 700 and the called station over line conductors 1081, 1082, respectively. The above circuit is the transmission circuit when a call is completed but is used in the present instance to establish a supervisory condition, should a station on the called line attempt to initiate a call before the last digit is dialed.

The toll operator dials the last digit 1. Relays 610 and 630 respond, and relay 630 at contacts 634 again extends a momentary ground to energize relays 970 and C1 in multiple. Relay C1 locks at contacts 871 in series with the coil of relay 830. Relay 630 re-energizes, opens contacts 634, and removes ground from pulse conductor 728. Relay 830 previously shunted, now energizes. Relay C1 at contacts 872 extends ringing interrupter conductor R1 to conductor 745. Relay 970 restores, and relay 710 energizes from ground on conductor 655 at contacts 662, contacts 834, conductor 729, contacts 972 and 973, contacts 904 and 923, conductor 736, contacts 716, coil of relay 710 to battery. Relay 710 energizes and locks at contacts 717 to ground on conductor 655 and at contacts 714 opens the pulsing circuit. At contacts 713, a circuit is prepared for energizing relay 730. At the start of each ringing cycle of the interrupter 761', a pulse of battery is momentarily connected to conductor PU—1 for energizing relay 730 by way of contacts 841, conductor 744, contacts 734 and 788, upper winding of pickup relay 730, contacts 704 and 713, conductor 729, contacts 834, conductor 655 to ground at contacts 662. Relay 730 energizes and locks at contacts 735, conductor 718, contacts 689, conductor 719 to a normally closed source of battery at interrupter 761'. Relay 730 at contacts 731 and 732 extends ringing control paths 745 and 746 to ring relays 750 and 760 of which only the relay 750 is effective when the ringing digit is 1. Since digit 2 was dialed as a first digit, relay 840 is not energized and only relay 750 is responsive to ringing ground pulses from the interrupter 761'. The circuit for relay 750 is traceable from battery of relay 750, contacts 731, 711, conductor 745, contacts 872, conductor R1 to ground pulses from interrupter 761'. Relay 750 is energized in response to the described ground pulses on the ringing interrupter conductor R1 and at contacts 755 closes ringing circuit to the called line conductor 1082 from ringing generator GEN., winding of ring cutoff relay 740, contacts 755, 764 and 782, conductor 652, contacts 1004, 1026 and 1058, conductor 1082 to the called station. Relay 750 at contacts 753 connects ground to the other line conductor 1081 as a return path for the ringing circuit in case of bridged ringing and also for operating the ring cutoff relay 740 when the called party answers. This circuit may be traced from ground, contacts 753, 762 and 781, conductor 637, contacts 1002, 1025 and 1057 to conductor 1081 and the called line. The ringing current is alternating current and includes a direct current battery potential for energizing the ring cutoff relay 740 when the called party answers. Relay 740 is energized over the previously traced line circuits when the called party answers. Relay 740 at contacts 741 energizes relay 690 over conductor 706 from the previously described ground on conductor 729. Contacts 691 disconnect ground from conductors 692 and 708 and relays 830 and C1 restore. At contacts 872 the ringing interrupter conductor R1 is disconnected from relay 750. At contacts 834 ground is disconnected from conductor 729 and relay 730 restores, further opening the circuit of relay 750.

Referring back to the prior description wherein ringing current is connected to the called line by the energization of relay 750. At contacts 756, relay 720 is energized at that time. Relay 720 at contacts 721 and 723 opens the transmission circuit of the called line. At contacts 722 and 724 ground and battery, through ressitance 725, is connected to conductors 637 and 652. Relay 720 is slow to release and will hold momentarily after relay 750 restores. Thus ground and battery are connected to the called line to drain any foreign potentials that remain on the called line after ringing current is applied before the line is extended to relay 700.

After the drain relay 720 restores the called line is extended to relay 700 over conductors 1081 and 1082, contacts 1057, 1058, 1025 and 1026, contacts 1002 and 1004, conductors 637 and 652, contacts 781 and 782, 762 and 764, 752 and 754, 721 and 723, 794 and 796 to the upper and lower winding of back bridge relay 700. When the called party answers, relay 700 energizes and at contacts 701 energizes relay 620 over conductor 653. Relay 620 at contacts 623 connects ground from contacts 646' over conductor 625', contacts 778, conductor 746' to battery at relay 600. Relay 600 thus energized, at contacts 604, connects grounded conductor 594 to conductor 659 to maintain ground on the control lead of the called line, thus maintaining the line busy when ground is removed at contacts 607, locks up to ground on conductor 646' through contacts 609, and at contacts 601 and 602, switches the calling lines 508 and 509 through to the called parties lines clear of all unnecessary bridges and attachments. At contacts 601' and 602', relay 600 disconnects the line relay 610 which restores and opens the circuit for relay 630 at contacts 611. Relay 630 now restores and opens the circuit for slow to release relay 640 at contacts 633. After a slight delay relay 640 restores and opens the locking circuit for relay 780 at contacts 642'. Relay 780 restores and disconnects the back bridge relay 700 from the line at contacts 781 and 782. Relay 700 restores and in turn causes relay 620 to restore at contacts 701. At contacts 642, relay 640 disconnects ground from relay 660 and conductor 594 thereby removing the shunt from around the lower winding of relay 250, thus permitting relay 250 to operate in series with relays 260 and 660 as has been hereinbefore explained. Relay 660 is maintained operated over this circuit to hold the connector relays operated under the control of the repeater. Talking battery for the called party is now had at relay 180 in the repeater.

If the called line is busy, test relay 780 will not find battery and hence will not operate, but ground will be returned from the line circuit (not shown) over conductor 1083, contacts 1059, 1027, 1006, conductor 659, contacts 924, conductor 658, contacts 605, conductor 657, and winding of busy relay 770 to battery. Relay 770 operates and locks to ground on conductor 655 at contacts 773, and closes a circuit at contacts 772 which sends 60 pulses of ground per minute over conductor 654, through contacts 626 and the lower winding of relay 620 to battery. Relay 620 now follows the pulses of ground alternately operating and restoring and at contacts 622 and 624 reverses battery sixty times a minute. Electro-polarized relay 150 now energizes 60 times a minute in response to the battery reversals and at contacts 151 causes relay 125 to follow the energization of relay 150. At contacts 127, relay 125 gives the toll operator supervision, in a manner hereinbefore described, denoting a busy condition in the connection.

Upon the completion of the conversation, the connection is released by the toll operator after supervision is received from the called party. When the called party hangs up, the loop circuit over which line relay 180 is operating is opened and consequently relay 180 restores. In restoring, relay 180 opens the energizing circuit of slow to release relay 200 at contacts 181 and opens the circuit to relay 125 and the lower winding of relay 160 at contacts 182. Relay 125 restores and at make before break contacts 126 and 127, maintains relay 130 energized over its upper winding alone instead of over both windings as had been the case. This results in a decrease of the resistance in the dialing loop to the toll operator, thus indicating to her that the called party has hung up and the connection is to be released. In response to this supervision, the toll operator now removes ground from conductor 107 in a well known manner thereby causing relay 130 to restore. Relay 130 opens the energizing circuit for slow to release relay 135 at contacts 132. Relay 135 restores after a slight delay and opens the energizing circuit for the upper winding of relay 160 at contacts 136. Relay 160, at contacts 164, opens the energizing circuit for relays 250, 260, 270, 290 and 660. It will be remembered that the ground at contacts 247 was holding relay 250 operated in series multiple with relays 260, 270, 290, and 660. The release of the hold slave relay 660 in the connector causes the finder connector link to restore to normal by removing the holding grounds at contacts 664, 662, and 667. The system is now restored and may be used on subsequent calls.

Suppose now that a call is initiated by a local subscriber to the toll operator B. It is thought unnecessary to give a detailed description of the connector operation on an outgoing call, reference being had to the aforementioned application for such a description. Suffice it to say that the connector operates responsive to a single dialled digit such as "0" to connect the calling subscriber's line to conductors 1084, 1085, and 1086 of the repeater in Figure 2. The connector, in connecting with conductors 1084, 1085, and 1086, operates its units relay 1010 which extends the ground from contacts 667 and conductor 698 through contacts 1017, conductor 936, contacts 919, conductor 742, contacts 777, conductor 707, and winding of relay 600 to battery. Relay 600 operates and switches the calling lines through the connector as before. Line relay 180 in the repeater now operates over the circuit from ground, upper winding of relay 180, contacts 171, repeater coil L1, conductor 202', contacts 257, conductor 1084, contacts 1043, 1011, 1001, conductor 637, contacts 601, subscriber's loop circuit extending through the finder, contacts 602, conductor 652, contacts 1003, 1012, 1044, conductor 1085, contacts 259, conductor 203', repeater coil L2, contacts 172, and lower winding of relay 180 to battery. Relay 180 operates and completes an obvious energizing circuit for relay 200 at contacts 181 and prepares a circuit for relay 125 at contacts 182. Hold slave relay 660 is maintained operated now from ground at contacts 247, lower winding of relay 250, contacts 209, conductor 1086, contacts 1045, 1013, 1005, conductor 659, contacts 604, 661 and winding of relay 660 to battery. Relay 660 holds the connector and finder relays operated under the control of the repeater. Relay 200 also completes an energizing circuit for relay 210 at contacts 207 and opens a point in the guard lead at contacts 208, thus busying the repeater to incoming calls. Relay 210 operates from ground at contacts 168, through conductor 129, contacts 207, and winding of relay 210 to battery, thus closing a point in a timing circuit to relay 245 at contacts 215 and preparing a locking circuit for relay 200 at contacts 216. Relay 210 closes a point in an energizing circuit for relay 220 at contacts 213 and completes the motor start circuit for the ringing machine at contacts 211. Relay 110 now operates from ground at contacts 168, conductor 129, contacts 207, conductor 134, contacts 121, 101, and winding of relay 110 to battery. Relay 110 thus energized opens a circuit to relay 100 at contacts 111, and prepares a start circuit for relay 120 at contacts 113. Relay 120 will operate when the ringing machine builds up enough speed and voltage to operate effectively, at which time ground will be returned over the generator test lead through contacts 113 and the winding of relay 120 to battery. Relay 120 thus operated opens the energizing circuit of relay 110 at contacts 121, completes a circuit to relay 125 at contacts 122, and at contacts 123 connects direct generator (not shown) through resistance $R_3$, contacts 104 and 123 to conductor 107 and the toll operator's position. Relay 110 restores thus completing an energizing circuit to relay 100 at contacts 111, and opening the energizing circuit of relay 120 at contacts 112. Relay 100 operates before relay 120 restores and opens a further point in the energizing circuit of relay 110 at contacts 101, completes a locking circuit for itself at contacts 103, removes generator from conductor 107 at contacts 104, and maintains relay 125 operated at contacts 105 from ground at contacts 182. Relay 120 in restoring opens the signalling circuit and closes the supervisory circuit at contacts 123. Relay 100 is now locked energized from ground at contacts 168 through contacts 207, 103, 111, and winding of relay 100 to battery.

The splash of generator which is applied to conductor 107 signals the toll operator as to the calling condition of the trunk in the well known manner. The toll operator, in response to this signal, plugs into the calling trunk and grounds conductor 107 thus causing relay 130 to energize and since relay 125 is operated, relay 130 energizes over both windings. Relay 130, at contacts 132, completes an obvious energizing circuit for relay 135 which operates and completes a circuit for relay 220 at contacts 139. Relay 220 now operates over the following circuit; from ground, contacts 139, conductor 106, contacts 213, 234, and the upper winding of relay 220 to battery. Relay 220 thus energized connects a bridge, including a condenser and the upper winding of relay 250, across the line at contacts 223 and 225. Relay 220 is a weighted spring relay of the type disclosed in Patent 1,641,256 issued September 6, 1927 to John Erickson. When relay 220 operates, its weighted spring 227 vibrates several seconds, preventing immediate operation of slow to operate relay 230. When the weighted spring finally comes to rest, contacts 224 are closed and relay 230 operates from ground at contacts 139 through conductor 106, contacts 213, 224, and the winding of relay 230 to battery. Relay 230 thus operated opens the motor start circuit at contacts 231 and at make before break contacts 232 and 234, opens the energizing circuit of relay 220 which restores and removes the bridge from across the line at contacts 223 and 225. Relay 230 is maintained energized through contacts 232, 213 and 139.

If the call to the toll operator is originating from a paystation telephone, a distinctive paystation tone will be applied to the control conductor 1086 in a well known manner. Relay 250 will act as a tone transformer and the paystation tone will appear across the line (conductors 202′ and 203′) via the aforementioned bridge of which the upper winding of relay 250 is an element. When relay 220 operates, the tone is connected across the line at contacts 223 and 225 for a length of time equal to the time of vibration of weighted spring 227 plus the operating time of slow to operate relay 230. If the toll operator, while completing the call, forgets the character of the calling station, she can re-establish the tone circuit by momentarily unplugging. In so doing, relays 130 and 135 will restore, the latter at contacts 139 opening the circuit to relay 230 which in turn will restore. Upon replugging, relays 130 and 135 will again operate completing the energizing circuit to relay 220 at contacts 139 and the splash of tone again appears across the line. The connection is released in a manner similar to the first case. Relay 180 restores when the calling local subscriber hangs up causing relay 125 to restore at contacts 182. In restoring, relay 125 causes relay 130 to operate over its upper winding alone thus giving the toll operator supervision in a now familiar manner. The toll operator releases the connection as before, by removing ground from conductor 107.

Consider now the operation of the system when a call is initiated from a trunk, through the instant exchange to the toll trunk T. Suppose now that the call comes into the exchange through a repeater and line circuit similar to those shown in Figures 1 and 2, and the finder finds the calling trunk on conductors 207, 208, and 209 of Figure 5. A clearer picture of the proposed connection may be had by referring to Figure 1 of the aforementioned application. The connection to be explained originates at a toll board like 16, through a repeater, line circuit, finder, connector, and a second repeater to a toll board like 290 which in this case is represented by the toll operator's position B. Both repeaters in this connection are like the repeater disclosed in Figures 1 and 2. The incoming repeater operation is similar to that described for the toll to local connection. Relays 130, 135, 160, 170, and line relay 265 in the line circuit are operated when the repeater is seized by the calling operator when she grounds conductor 107. The line circuit associated with the calling trunk will extend ground over conductors 180 and 182 to operate relays 300 and 330 in Figure 3. Relay 300 operates relay 420 at contacts 301 and relay 330 extends ground from contacts 331 over conductor 392, contacts 426, conductor 457, contacts 558, conductor 457′, and lower winding of relay 930 to battery. Relay 930 extends the ground from contacts 667 and conductor 698, through contacts 936 to conductor 699 and the lower winding of relay 625 to battery. The connector responds to the dialing of the single digit "0" by the calling operator to connect with the trunk repeater of Figures 1 and 2 over conductors 1084, 1085, and 1086. In completing this connection, units relay 1010 operates and extends the ground from contacts 667 on conductor 698 through contacts 1017, conductor 986, contacts 919, conductor 742, contacts 777, conductor 707, and winding of relay 600 to battery. Relay 600, as in the previous cases, switches the calling line through the connector clear of all bridges and attachments. Relays 610, 620, and 640 de-energize but slow to release relay 640 does not restore at once. Relay 625 now extends ground from contacts 629′, over conductor 726, through the group access relays (not shown but like Figure 12 of the aforementioned application) and back to relay 240 over the extra control lead EC. Relay 240 operates and locks up to grounded conductor 1086 at contacts 242. The operation of relay 600 causes relay 180 in the outgoing repeater to operate in series with the upper winding of a relay like 150 in the incoming repeater. Relay 180 energizes relay 200 at contacts 181 and relay 200 extends the ground from contacts 247 and the lower winding of relay 250, through contacts 209, conductor 1086, contacts 1045, 1013, 1005, conductor 659, contacts 604, 661, and winding of relay 660 to battery. A similar ground is being extended from the incoming repeater as follows; (consider the repeater of Figures 1 and 2 to be the incoming repeater for the moment) from ground at contacts 247 through the lower winding of relay 250, conductor 114, contacts 164, conductor 115, contacts 261, 269, conductor 209 (instead of conductor 204), contacts 506, 533, 545, conductor 594, contacts 661, and winding of relay 660 to battery. It is seen that hold slave relay 660 is being held operated from two separate grounds from the two repeaters each circuit including the lower winding of a relay like relay 250. The current flowing through each of these circuits is insufficient to cause either of the relays like relay 250 to operate.

The called toll operator now grounds conductor 107 causing relays 130, 135, 220, and 225 to operate. The ground at contacts 139 is extended over conductor 106, contacts 213, 241 to relay 255 and battery. Relay 255 reverses battery connections at contacts 256 and 258 thus causing the relay like relay 150 in the incoming repeater to operate and indicate to the calling operator that the called operator has answered in a manner previously described. Talking battery for this part of the connection is furnished at relay 180 in the outgoing repeater.

The connection is released by the last operator to unplug. The operators receive local supervision when the conversation is completed. The last operator to unplug will remove the last holding ground circuit for relay 660 hence relay 660 will restore and release the operated finder and connector relays in a now familiar manner.

Having described the invention, what is new and is desired to be protected by Letters Patent will be set forth in the following claims.

What is claimed is:

1. In an all relay type telephone system, calling and called local lines, a repeater, an all-relay connector including a line relay and a back bridge relay, said line relay having two windings through the medium of which talking current is fed to the calling line in response to said connector being included in a connection between said local calling and called lines, said back bridge relay also having two windings through the medium of which talking current is fed to said called line responsive to said connector being included in said connection between said local calling and called lines, means in said connector operated to disconnect said line relay and said back bridge relay responsive to said connector and said repeater being included in a different connection, said different connection including a called one of said local lines, and means in said repeater for feeding talking current to the local called line when said connector is included in said different connection.

2. In an all-relay type telephone system, calling and called local lines, a repeater, and a trunk line connected to said repeater; a connector, means in said connector for furnishing talking current to said local calling and called lines responsive to said connector being included in a connection therebetween, a second means in said connector operated responsive to said connector being included in a connection resulting from a call being initiated over said trunk line and through said repeater to said connector and said called local line for disconnecting said first means, a third means in said connector operated responsive to said called line being found busy in the extension of said last mentioned call for repeatedly reversing battery connections to said repeater, and relay means in said repeater operate in response to said battery reversals for causing a signal to be sent back over said trunk line by changing the resistance of an element of said trunk line.

3. In a telephone system, an all-relay connector, a trunk line, a repeater terminating said trunk line, said repeater including a relay, a called line, said connector being accessible to said trunk line and having access to said called line, means responsive to an incoming call over said trunk line and repeater for operatively connecting said repeater to said connector, the connection between said repeater and said connector including two talking conductors and a control conductor, means in said connector, operated upon seizure of said connector, for connecting ground to said control conductor thereby shunting said relay, means controlled from said repeater for operating said connector to complete a connection from said trunk line to said called line, a switch through relay, means for operating said switch through relay in response to said called party answering for removing ground from said conductor to thereby remove the shunt from said first relay to cause operation of said first relay, a third relay operated in response to the operation of said first relay, and a talking battery source in said repeater connected to said talking conductors in response to said operation of said third relay.

4. In a telephone system, a called line, a repeater terminating an incoming trunk line, an all-relay connector having access to said called line, means responsive to an incoming call over said trunk line and repeater for operatively connecting said repeater to said connector, means controlled from said repeater for operating said connector to complete a connection from said incoming trunk line to said called line, a battery feed bridge in said connector, means in said connector for connecting said battery feed bridge to said called line in response to the establishment of said connection, a relay in said repeater having its operating winding shunted in response to the connection of said repeater to said connector, means responsive to a party on the called line answering for removing said shunted condition of said relay to operate said relay, means in said connector also responsive to the party on said called line answering for disconnecting said battery feed bridge from said called line, and means in said repeater responsive to the operation of said relay for thereafter feeding talking battery to said called line.

5. In an all relay connector accessible from incoming trunk lines and local calling lines and having access to outgoing trunk lines and local called lines, talking conductors in said connector, a line relay normally connected to said conductors for controlling the operation of said connector and for feeding talking battery in the direction of an incoming call, a back bridge relay for feeding talking battery to called local lines, a test relay operated in response to the establishment of a connection to one of said called lines for connecting said back bridge relay to said conductors, means for operating said back bridge relay in response to a party on said called line answering, a switch through relay operative to disconnect said line relay from said conductors to release said line relay, means for operating said switch through relay in response to a calling one of said lines operating said connector to establish a connection to one of said outgoing trunk lines to thereby disconnect said line relay from said talking conductors to release said line relay, means for thereafter feeding talking battery from said outgoing trunk line over said conductors to said calling line, means responsive to the operation of said back bridge relay in an established connection between one of said incoming trunk lines and said called line for operating said switch-through relay to disconnect said line relay from said conductors to thereby release said line relay, means responsive to the release of said line relay for releasing said test relay to disconnect said back bridge relay from said conductors, and means for thereafter feeding talking battery from said incoming trunk lines over said conductors to said called lines.

6. In a telephone system as claimed in claim 5 including means controlled from said incoming trunk line after the release of said line relays for maintaining said established connection under control from said incoming trunk line.

ROY W. JONES.

REFERENCES CITED

The following references are of record in the file of this patent:

UNITED STATES PATENTS

| Number | Name | Date |
|---|---|---|
| 2,008,903 | Evers | July 23, 1935 |
| 2,023,239 | Ostline | Dec. 3, 1935 |
| 2,177,079 | Saunders | Oct. 24, 1939 |
| 2,287,383 | Lomax | June 23, 1942 |
| 2,317,833 | Voss | Apr. 27, 1943 |
| 2,359,625 | Crocker | Oct. 3, 1944 |
| 2,427,650 | Bakker | Sept. 23, 1947 |
| 2,431,850 | Voss | Dec. 2, 1947 |
| 2,443,945 | Bellamy | June 22, 1948 |